May 1, 1951     V. VON K. SUNDT     2,551,226

HYDRAULIC COLLET CHUCK

Filed Dec. 11, 1944     4 Sheets-Sheet 1

Vigo von Krogh Sundt
INVENTOR.

BY *[signature]*
ATTORNEY.

Vigo von Krogh Sundt
INVENTOR.

BY
ATTORNEY.

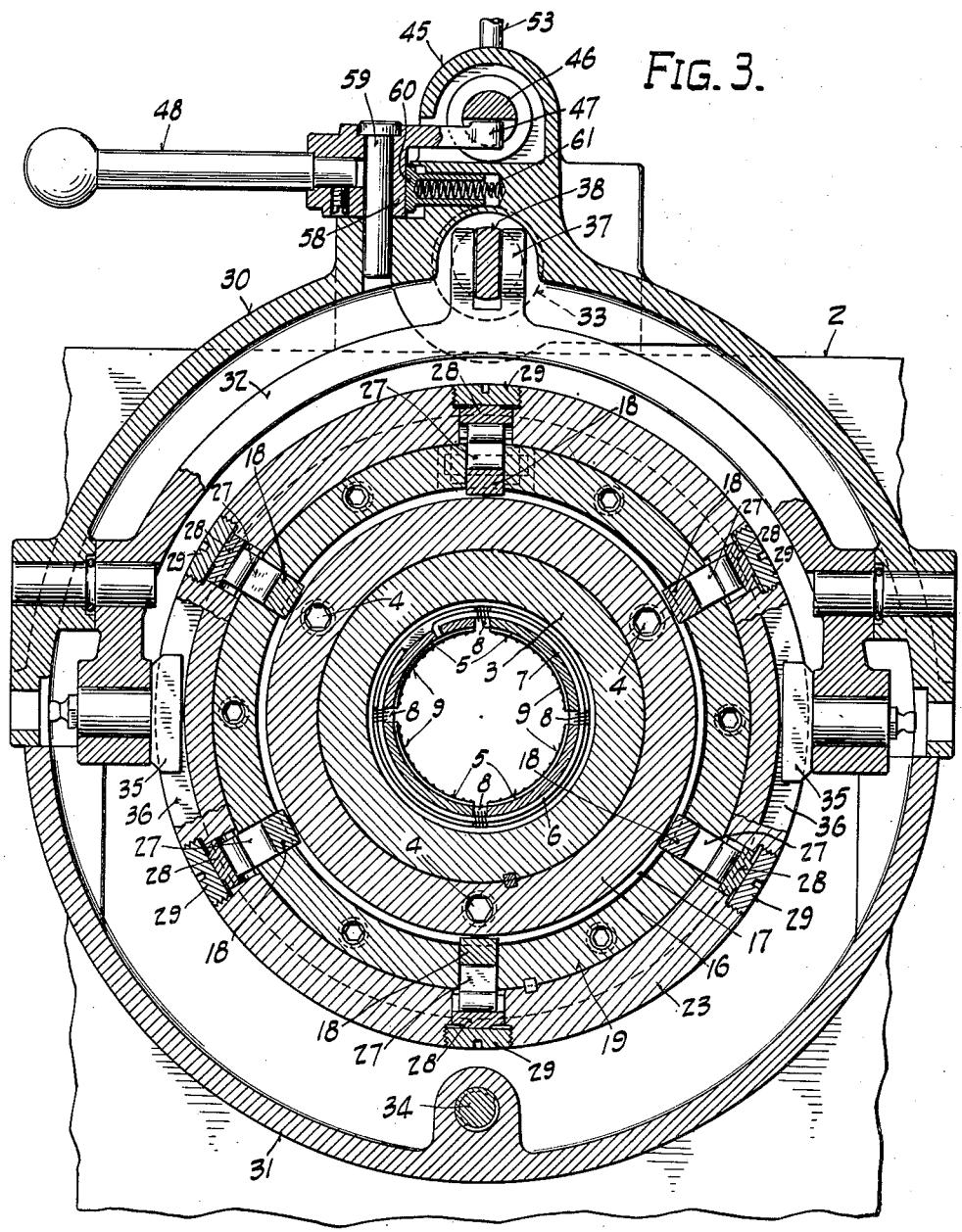

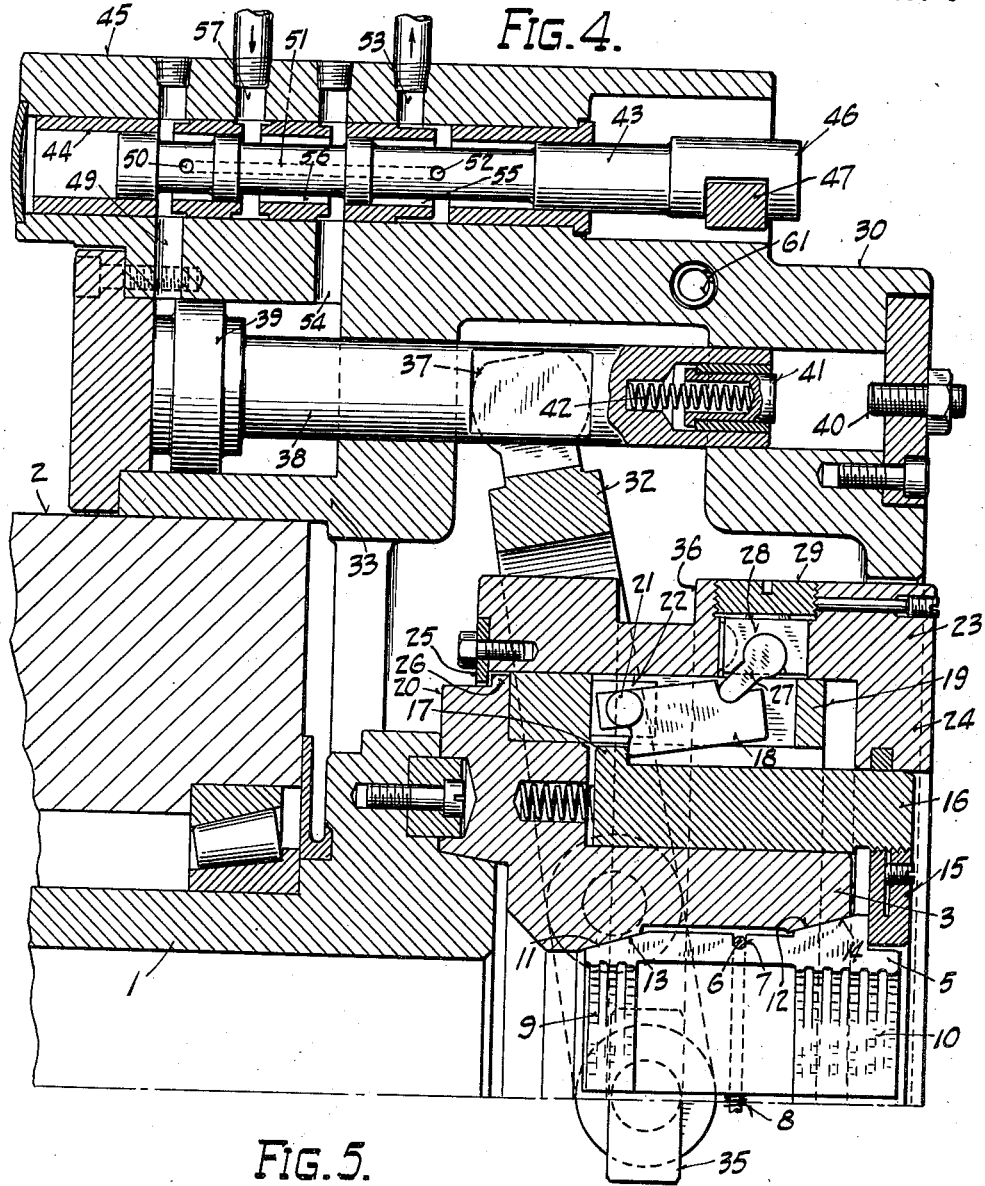
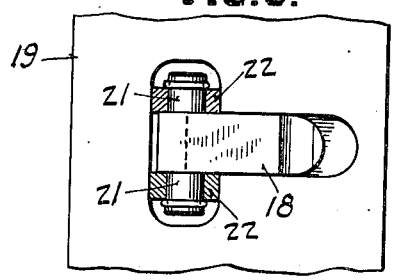

Patented May 1, 1951

2,551,226

UNITED STATES PATENT OFFICE 2,551,226

HYDRAULIC COLLET CHUCK

Vigo von Krogh Sundt, Madison, Wis., assignor to Gisholt Machine Company, Madison, Wis., a corporation of Wisconsin Application December 11, 1944, Serial No. 567,555

5 Claims. (Cl. 279—4)

This invention relates to a hydraulic collet chuck and has been applied to the construction of chucks for attachment to lathe spindles and the like.

One of the objects of the invention is to provide a collet chuck operated by hydraulic power and readily controllable manually without fatigue of the operator.

Another object is to provide for more rapid operation and release of the chuck.

Another object is to provide greater gripping pressures over larger surface areas.

Another object is to provide a hydraulic externally operated collect chuck avoiding the use of an operating sleeve or rod through the spindle of the lathe, and make possible the use of the full capacity of the spindle bore for bars and the like.

A further object is to provide a hydraulically operated collet chuck.

The invention is illustrated in the accompanying drawings in which:

Fig. 3 is a transverse section taken on line 3—3 of Fig. 2;

Fig. 4 is an enlarged detail section on the plane of Fig. 2 showing the toggle operation; and Fig. 5 is a plan view of the toggle finger.

Figure 1:
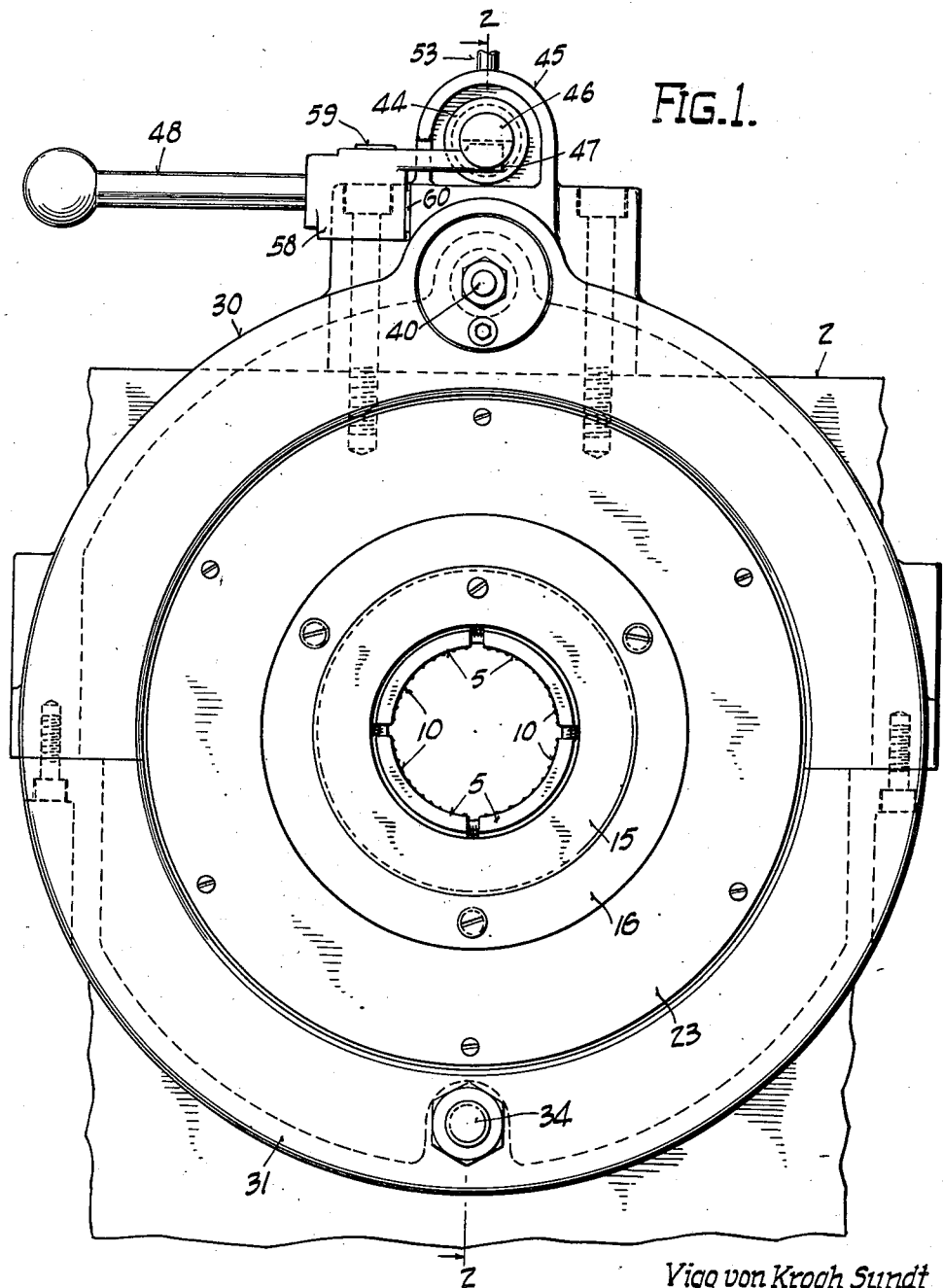
Figure 1 is a front elevation of the chuck.

In carrying out the invention the chuck is provided with a slider ring operated by shifter shoes from a hydraulic cylinder, and which ring in turn operates a pusher sleeve by means of a plurality of toggle levers seated in the ring and spaced around the same.

Referring to the drawing, the chuck may be divided into two parts; the rotating mechanism secured to the rotating lathe spindle 1 and the non-rotary mechanism supported on the fixed head stock 2 of the lathe.

The rotating mechanism comprises, in general, the inner chuck body 3 secured directly to the end of the spindle by bolts 4 and having a central bore containing the collet pads 5.

The collet pads 5 constitute segments held in circumferentially spaced relation inside the body 3 by the retainer spring 6 lying in a circumferential groove 7 therein and by spacer coil springs 8 surrounding the spring 6 between the pads.

The inner surfaces of the pads 5 have grooved or knurled gripping faces 9 and 10 at the opposite ends thereof and of substantial area to grip the work. The outer surfaces of the pads 5 have conical risers 11 and 12 behind the respective faces 9 and 10 and facing toward the rear of the chuck to engage corresponding complementary conical risers 13 and 14 on the inner surface of chuck body 3.

The forward ends of pads 5 are recessed to receive the circular adjusting plate 15 threaded into an axially movable pusher sleeve 16 and abutting an accurately machined shoulder of each of the pads 5. Sleeve 16 is keyed to rotate with chuck body 3.

The pusher sleeve 16 is mounted on the outside of chuck body 3 to reciprocate axially thereof and has a flange 17 at its rear end for receiving rearward actuating pressure from a plurality of circumferentially spaced toggle fingers 18.

The toggle levers 18 are mounted in openings in a cylindrical outer chuck body 19 bolted to the rear flange 20 of body 3. The levers 18 extend longitudinally in the body 19 and each lever has a pair of aligned trunnions 21 at its rear end pivoted in bearing blocks 22 in the rear end of the corresponding opening in body 19.

A cylindrical slider 23 surrounds and is keyed to rotate with the outer chuck body 19 and has an inward flange 24 at the front sealed against the outer surface of pusher sleeve 16. The slider 23 is prevented from accidental removal forwardly of the chuck by a stop washer 25 bolted to the rear face of the slider and riding in a recess in flange 20 to engage an abutment 26 at the forward end of the recess and thereby limit the forward movement of the slider.

The slider 23 carries a plurality of toggle fingers 27, one for each lever 18, the fingers 27 being individually pivotally mounted in toggle seats 28 inserted in radial openings in the slider and held in accurate position by the corresponding threaded adjusting plugs 29.

Each toggle finger 27 constitutes a cylindrical body rotatably mounted in a circular slot in the corresponding seat 28 and having a radially inward depending lever arm the end of which engages in a recess in the outer surface of the corresponding toggle lever 18 near its forward end.

The dimensions of the fingers 27 and levers 18 and the connecting and operating members are such as to provide for a radially inward pressing of the forward ends of levers 18 when slider 23 is moved rearwardly to bring fingers 27 to a radial position just past dead center which is normal to the axis of the chuck. This inward movement of levers 18 effects a rearward thrust on pusher sleeve 16 by means of the engagement by the rear end of the levers with the flange 17.

When slider 23 is moved forwardly the fingers 27 are tilted as shown in Fig. 4, thereby releasing the forward ends of the levers 18 for outward movement. Release of the levers 18 allows the pusher sleeve to move forward under the influence of a feeding movement of the workpiece and springs located in chuck body 3, which tends to move the collet pads 5 forward and to expand the same along the conical risers previously described.

The operating movement of slider 23 is effected by the non-rotary operating mechanism fixed to the headstock 2 and which comprises, in general, an upper semi-cylindrical housing 30, a lower complementary semi-cylindrical housing 31, a shifter fork 32 pivotally mounted inside the upper housing and a hydraulic cylinder 33 mounted on the housing 30 to operate fork 32.

The upper housing 30 is integral with and depends from the cylinder block 33, the latter being bolted to the top of headstock 2. An anchor bolt 34 secures the bottom of housing 31 to the headstock 2.

The shifter fork 32 straddles the chuck and has a shifter shoe 35 on each depending arm thereof extending radially inward to seat in a circumferential groove 36 in slider 23 at horizontally diametrically opposite sides of the chuck. The upper central portion of fork 32 has an upward split fork-like knob 37 extending into recesses in the opposite sides of piston rod 38 of cylinder 33.

The piston rod 38 extends parallel to the axis of the chuck and is operated by piston 39 secured to its rear end and reciprocating in cylinder 33. When piston 39 is moved to the rear end of cylinder 33 the shifter fork 32 is tilted rearwardly thereby moving slider 23 forwardly by means of the shifter shoes 35 and releasing the toggle levers 18. When piston 39 is moved to the forward end of cylinder 33 the shifter fork 32 is raised to perpendicular position moving slider 23 rearwardly and effecting operation of fingers 27 against the levers 18 to move the pads 5 rearwardly against their conical seats.

The movement of fingers 27 past dead center takes all pressure or stress off from fork 32 and the latter is relieved for floating in this position. For this purpose the piston 39 is returned a slight increment from the end of its stroke upon release of operating fluid pressure thereagainst in cylinder 33, by means of the adjustable stop 40 in cylinder block 33 engaging a sleeve 41 mounted in the forward end of the piston rod 38 and pressed forwardly by the spring 42 disposed in the piston rod.

Operation of piston 39 in cylinder 33 is effected by a manually operated control valve 43 of the piston type reciprocally mounted in a ported bushing 44 in an upper housing 45 on cylinder 33. The control valve 43 has a recessed forward head 46 for receiving the short end 47 of a pivoted manual control lever 48.

Figure 2:
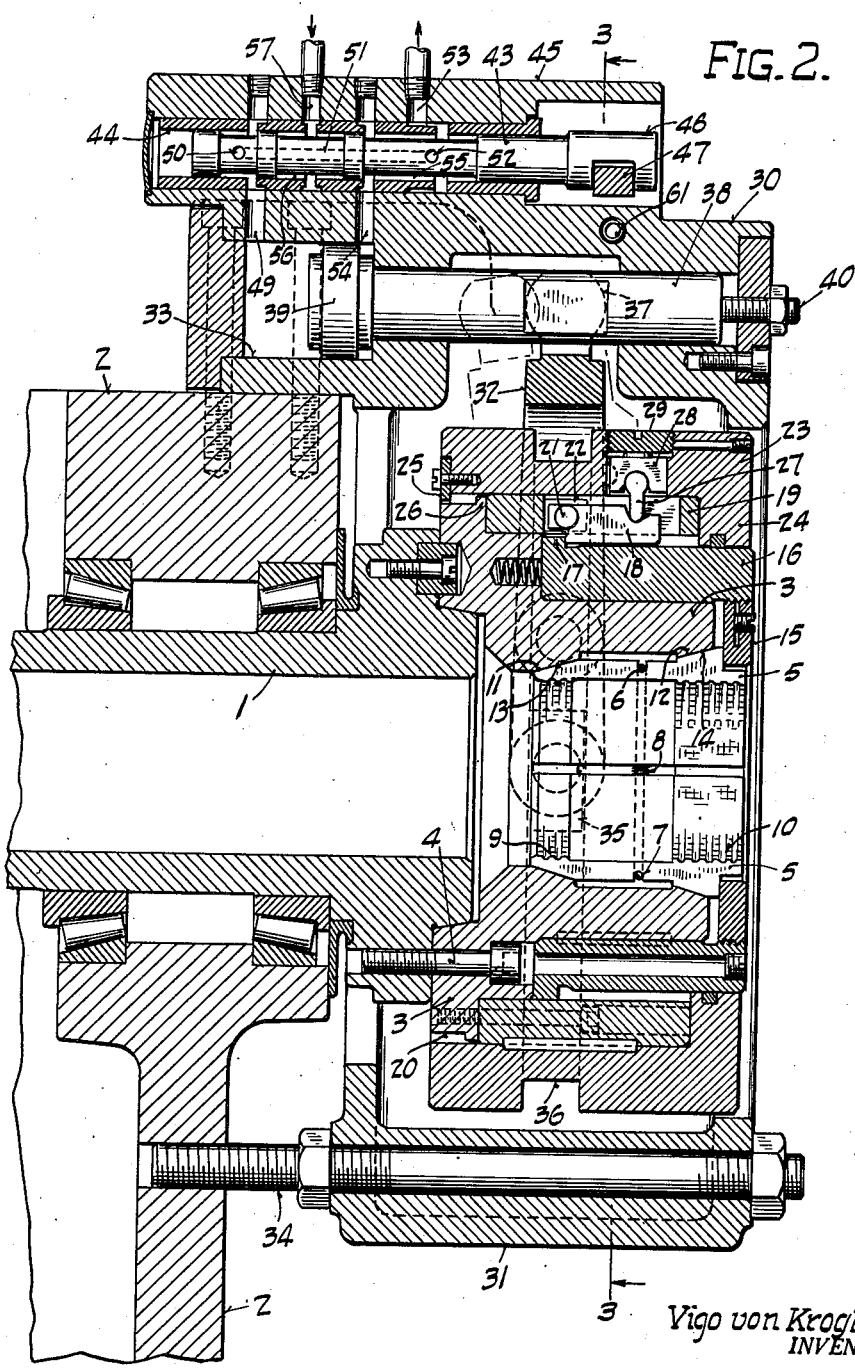
Fig. 2 is a vertical central section taken axially of the chuck on line 2—2 of Fig. 1.

The control valve 43 is moved longitudinally between two extreme operative positions and a central neutral position by the lever 48. In the central neutral position illustrated in Fig. 2 the rear end of cylinder 33 is connected by passage 49 through port 50 and longitudinal passage 51 in valve 43 to port 52 in the forward end of the valve and thence to the return passage 53 which constitutes the exhaust for the cylinder. At the same time, the forward end of cylinder 33 is connected through passage 54 in the cylinder block to passage 55 around the control valve 43 and thence to discharge passage 53.

When the control valve 43 is moved forwardly to release the chuck, the passage 54 is disconnected from passage 55, and instead the passage 56 around the piston valve connects passage 54 with a central intake port 57 for oil under constant pressure, thereby admitting operating pressure fluid to the forward end of cylinder 33 and pushing piston 39 rearwardly. Oil is discharged from the rear end of cylinder 33 through passage 49, port 50, passage 51, port 52 and return passage 53.

When the control valve 43 is moved rearwardly to operate the chuck to gripping position, the passage 56 is disconnected from passage 54 and is connected to passage 49 to admit pressure fluid to the rear end of cylinder 33. The port 50 is disconnected from passage 49 and oil is discharged from the forward end of cylinder 33 through passage 54, passage 55 and return passage 53.

The control lever 48 is normally held in neutral position by an eccentric hub 58 surrounding the vertical pivot pin 59 for the lever, and which is designed with a nearly flat side pressing against a neutralizing bushing 60 movably mounted in housing 45 radially of pin 59 and pressed against the hub by spring 61 in the housing.

The chuck has a tremendous gripping force obtained by toggle lever action from a relatively small hydraulic cylinder controlled by a valve which is in turn manipulated by a light touch of the operator on an operating lever.

The number of toggles may be varied to provide any predetermined gripping force desired. The chuck illustrated has six such toggles spaced around the circumference of the same.

In operation the toggles are self-locking when a workpiece is gripped, and the continued gripping of the workpiece is not dependent upon the maintaining of the required fluid pressure in the power cylinder. The pressure on piston 39, is completely neutralized when the operator lets go of the control valve lever 48 and the latter returns to a neutral position. Frictional engagement of the shoes with the slider ring is substantially eliminated by providing a relief for the yoke or fork so that the shoes mounted on the fork 32 do not touch either side of the groove in the slider 23 when the chuck is gripping a workpiece. This leaves the chuck for free rotation.

The control valve normally being held in neutral position, only effects actuation of the power cylinder during displacement of the valve from such position, by the manual lever to effect movement of the piston. When the piston reaches its final position the control valve returns to neutral position upon the release of the manual lever. The piston has two positions, one in which the chuck is closed with the collet pads gripping a workpiece and the other in which the chuck is open with the collet pads expanded outwardly to non-gripping position.

Various embodiments of the invention may be employed within the scope of the accompanying claims.

I claim:

1. In a rotating chuck of the class described having a plurality of collet pads arranged to grip a workpiece therebetween and operated by an axially movable pusher sleeve, a plurality of circumferentially spaced toggles disposed to move said pusher sleeve for effecting gripping of the workpiece, a lever disposed to actuate and release said toggles simultaneously, each said toggle constituting a lever and a finger for actuating the same disposed to be locked past dead center when the chuck is gripping a workpiece, a fluid pressure power cylinder having a piston disposed to actuate said toggles, a manualy operable control valve for said cylinder having a neutral and two operating positions, and means normally maintaining said valve in neutral position to relieve said first mentioned lever of stress while the work is gripped.

2. In a chuck of the class described having a plurality of collet pads for gripping a workpiece therebetween, a plurality of circumferentially spaced toggles disposed to actuate said pads and adapted to be self-locked by passing dead center when a workpiece is gripped, a fluid pressure power cylinder having a piston disposed to actuate said toggles, a manually operable control valve for said cylinder having a neutral and two operating positions, and means normally maintaining said valve in neutral position.

3. In a chuck of the class described having a plurality of collet pads arranged to grip a workpiece therebetween and an axially movable pusher sleeve for operating the same, a plurality of circumferentially spaced toggle levers bearing longitudinally against said sleeve to move the same for gripping and releasing the work, a slider ring encircling the chuck, an actuating finger carried by said slider ring and engaging a corresponding toggle lever to effect operation thereof, a fluid pressure power cylinder, a lever yoke connecting the piston of the cylinder to said slider ring to effect operation of the chuck, said toggle levers being adapted to be actuated past dead center for holding the collet pads in gripping engagement with the work, and means to relieve the fluid pressure in said power cylinder upon actuation of said collet pads to chucking position whereby the yoke is free from pressure against said slider ring.

4. In a chuck of the class described, a plurality of complementary collet pads arranged in spaced circumferential relation and mounted for limited axial and radial movement to grip a workpiece centrally thereof and for rotation to effect rotation of the workpiece, a chuck body surrounding said pads and adapted to support the same radially when gripping the workpiece, an axially movable pusher ring engaging said pads to effect axial movement of said pads and a cam action between said pads and said chuck body to thereby determine the radial position of the pads and the gripping pressure applied thereby, a plurality of toggle levers spaced about the circumference of the chuck and adapted to operate said axially movable means, an axially movable slider ring surrounding said toggle levers and adapted to operate the same, and a fluid pressure power cylinder having its piston connected to said slider ring to move the same and effect operation of the chuck.

5. In a rotating chuck of the class described having a cylindrical chuck body carrying a plurality of radially movable collet pads therein and an axially movable pusher sleeve for actuating said pads, an outer cylindrical chuck body surrounding said sleeve and having circumferentially spaced radial openings therethrough for receiving toggles, a toggle lever pivotally mounted in each said opening and adapted to effect movement of the sleeve axially of the chuck, a slider ring encircling said outer chuck body and carrying a plurality of toggle fingers for actuating said toggle levers, the toggle fingers being adjustably and pivotally mounted and spaced circumferentially to provide a finger for each toggle lever adapted to press and release one end of the lever radially, and means disposed to slide said ring axially to effect simultaneous operation of said toggles.

VIGO von KROGH SUNDT.

REFERENCES CITED

The following references are of record in the file of this patent:

UNITED STATES PATENTS

| Number | Name | Date |
|---|---|---|
| 489,933 | Conradson | Jan. 17, 1893 |
| 637,772 | Eilers | Nov. 28, 1899 |
| 725,346 | Krug | Apr. 14, 1903 |
| 1,818,305 | Class | Aug. 11, 1931 |

FOREIGN PATENTS

| Number | Country | Date |
|---|---|---|
| 420,616 | Great Britain | of 1934 |